United States Patent Office 3,390,969
Patented July 2, 1968

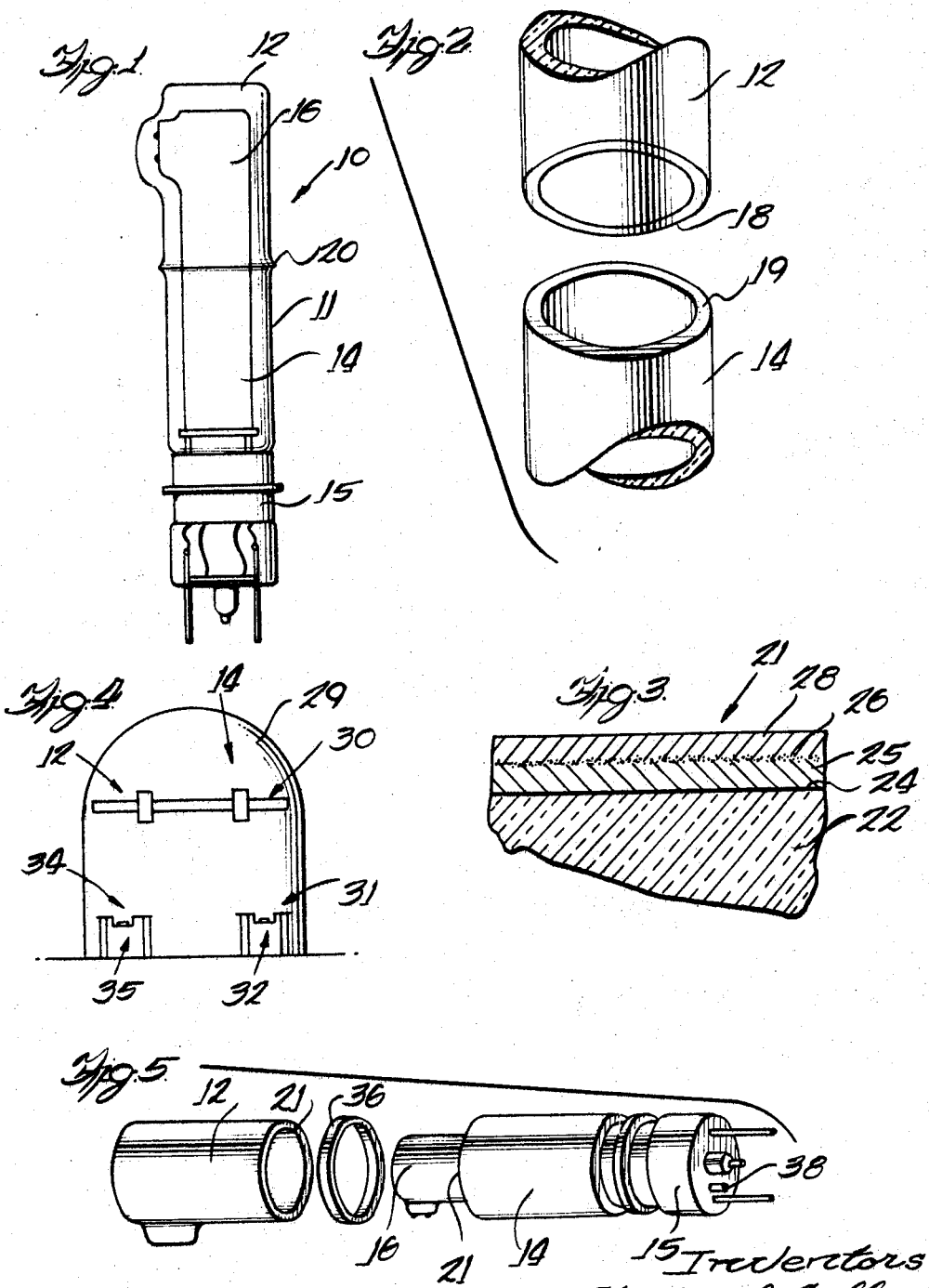

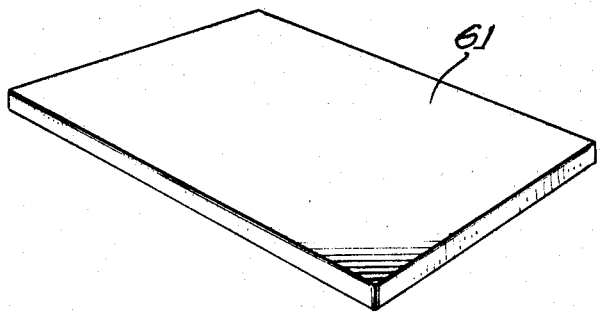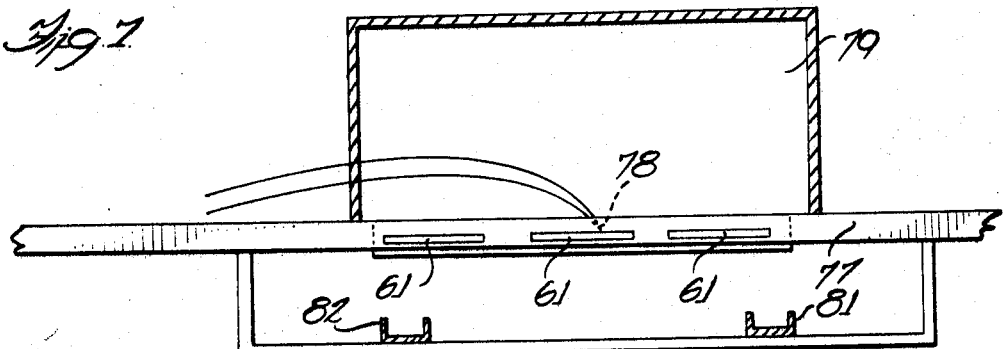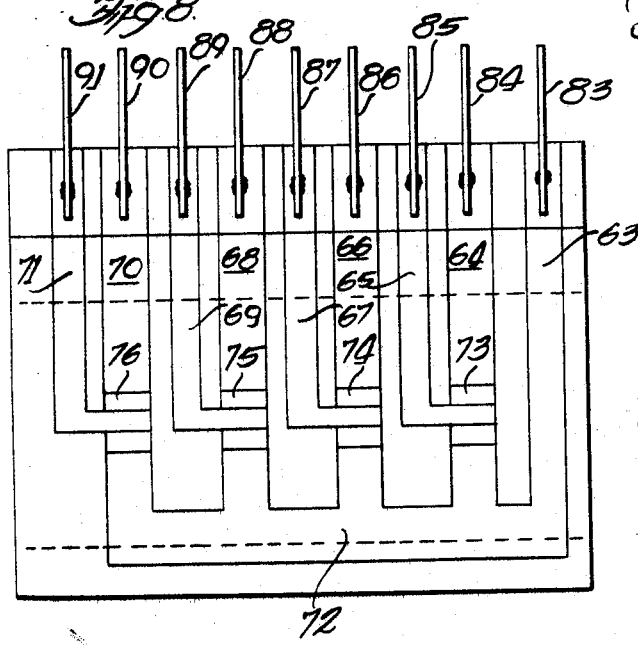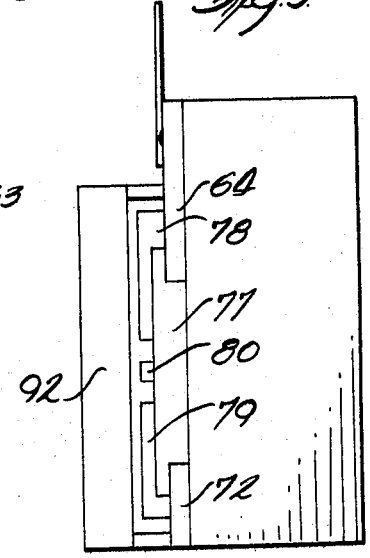

3,390,969
NOBLE METAL COATED CERAMIC SUBSTRATE FOR GLASS SEALS AND ELECTRONIC CONNECTOR ELEMENTS
Stephen J. Sullivan, Weston, and Merritt W. Albright, West Peabody, Mass., assignors to Infrared Industries, Inc., Santa Barbara, Calif., a corporation of Delaware
Continuation-in-part of application Ser. No. 333,476, Dec. 26, 1963. This application Apr. 27, 1966, Ser. No. 560,392
10 Claims. (Cl. 29—195)

ABSTRACT OF THE DISCLOSURE

This invention relates to a laminated material wherein a ceramic substrate is coated in sequence with a metal oxide, a metal selected from the group of copper, nickel, chromium, manganese, titanium, stainless steel, and nickel-chromium, and a noble metal selected from the group consisting of gold, silver, platinum, rhodium and iridium. The material is utilized in making glass to glass seals and for electronic components especially photoconductor detectors.

---

This application is a continuation-in-part of application Ser. No. 333,476 filed Dec. 26, 1963, now abandoned.

The present invention relates to metal coated substrates useful in making a joint, a seal, a weld or the like between two elements, and to its preparation. More particularly, this invention relates to a unique permanently bonded metallic film on a non-metallic substrate. The film is particularly useful as a surface joint in a glass to glass seal such as in glass tubular constructions employed in the instrumentation and electronic fields. It is also particularly useful as a base for electronic elements whereby metallic leads may be easily secured thereto for effecting a circuit with said element.

In the preparation of various electronic devices, and more particularly in the preparation of electronic tubes, substantial evacuation of the interior is frequently required after the various tube elements are placed therein. In certain instances, such as in photoconductor cells where indium antimonide is employed, the glass to glass seal usually provided to seal the elements within the tube, the seal is preferably made at the lowest temperature possible. Otherwise, photoconductor elements may be damaged and possibly completely destroyed.

Sealing techniques have been employed in the past such as disclosed in United States Patent No. 2,446,277 issued Aug. 3, 1948, entitled "Glass to Metal Seal in Electrical Devices." Such seals, however, do not contemplate a glass to glass relationship where low temperature sealing is of paramount importance, and where the electrical property of the seal is of no major significance. In addition, the seals which have heretofore been employed often merely rely upon a physical interlocking relationship between the glass and metal.

In certain structures, such as multi-element infrared detector arrays, it is desirable to place the detector elements on a base, such as quartz and then affix leads thereto. Since the element is extremely fragile, it is difficult to do this. So, as an alternative, the trade fastens the detector elements to a highly conductive metallic layer, such as gold, on an insulator base and the leads are then affixed to the metallic layer. In prior art techniques, the metallic layer was only loosely affixed to the base such as by metallic evaporation or by gold leaf bonding or the like.

Shifting and breakage of the layer frequently occurred. The resultant malfunction was oftentimes extremely costly due to the fact that successful operation of the detector element triggered the entire subsequent operation of the costly mechanism.

An object is to provide a novel metallic coated substrate structure as a result of the technique.

Another object is to provide a bonded metallic layer on a substrate wherein the bond is substantially integral so that separation is virtually impossible.

Still another object is to provide a method for the preparation of a seal which can be accomplished even at very low temperatures in the range from 150° F. to 350° F. A related object is to provide such a seal, which may be optionally made between two glass elements, or glass and metal. Indeed, when desired, the same low temperature sealing characteristics can prove advantageous between two elements in a metal to metal seal.

Another object is to provide a seal susceptible of low temperature completion which is sturdy, durable, and calculated to outlast the life of the device enclosed by the seal.

Another object is to provide a novel metallic coated substrate useful for bonding heat, light and similar detector elements thereto.

Another object is to provide a novel metallic coated substrate, of the above character, in miniature size but to highly accurate specifications.

Further objects and advantages of the present invention will become apparent as a description of several embodiments illustrative of the invention proceeds.

FIG. 1 is a front elevation of an indium antimonide detector employing a glass to glass seal illustrative of the present invention.

FIG. 2 is an enlarged, exploded, cutaway, partially diagrammatic view of the two tubular elements which are sealed in a manner illustrative of the invention.

FIG. 3 is an enlarged diagrammatic, cutaway, transverse section of an end of a tubular member prepared for a solder seal in accordance with a method illustrative of the subject invention.

FIG. 4 is a diagrammatic view of an evaporating chamber illustrating how the surfaces of the tubular members are prepared for sealing.

FIG. 5 is an exploded perspective view of the detector shown in FIG. 1 illustrating the relationship between the solder ring and the two tubular elements to be sealed.

FIG. 6 is a top plan view of a substrate upon which a metallic film is to be bonded.

FIG. 7 is a side cross-sectional view of the metallizing apparatus for such bonding.

FIG. 8 is a top plan view of the finished substrate having an array of infrared detector elements affixed thereto in circuit arrangement.

FIG. 9 is a side cross-sectional view of the finished substrate and ready for use as an infrared detector.

In broad outline, the subject invention contemplates a method for the preparation of a metallic coated substrate wherein the bond is so strong that the structure is useful as part of a joint for sealing or as a base for mounting fragile or delicate electronics elements thereto in circuit arrangement. The invention also embraces the joint and the finished detector element.

In forming a joint, the elements to be sealed are first provided with complementary faces, normally the two faces of the end of a glass tube. The faces of the host material are chemically cleaned, and heated to drive out occluded water and volatile impurities prior to placing the same in an evaporating chamber. A base metal is first evaporated onto the faces which are to be sealed in the presence of sufficient oxygen to provide a base metal oxide in an absorptive soluble relationship with the end faces of the tubes. Thereafter the base metal is evaporated so as to form a thin layer atop the oxide layer and in a mutually absorptive or soluble relationship with the oxide. Then, and preferably prior to concluding the evaporation of the base metal, evaporation of a noble metal is instituted so as to form a layer of the noble metal atop the base metal. With such overlapping concurrence of evaporation, a diffused interface of noble metal and base metal results.

The same technique is used for forming the metal coated substrate. The substrate, usually of a dielectric material such as quartz, ceramic, aluminum oxide, plastic, or glass is chemically cleaned, then heated to drive off occluded water. It is then placed in an evaporating chamber and appropriately masked to effect a desired circuit. Then an alloy, such as gold alloy, followed by the pure metal, such as gold, is evaporated onto the unmasked portions of the substrate. This sequence of alloy-pure metal evaporation results in a diffused interface of pure metal-metal alloy-substrate. It appears that the mechanism of the excellent bond of the base metal to the quartz substrate is apparently created by a chemical bond. The intense affinity for oxygen of the base metal combines with a free valence of the oxygen in the substrate, silicon oxide in the case of quartz, to form a strong chemical bond. The affinity of this bond is further metered by specific percentages of other base metals allowing fabrication peculiar to specific circuitry, such as infrared detector manufacture. In the latter, the bond adhesion must be able to withstand chemical cleaning, such as boiling in nitric acid and yet such that it may be diamond scribed without cutting deeply into the quartz base. The technique of this invention accomplishes satisfactory bond adhesion.

For the purposes of a more detailed description of the subject invention, "absorptive relationship" refers to that relationship between the metal or oxide being evaporated and its adjacent surface which forms an intimate bond either by way of absorption, molecular interlacing, or solubility in a degree not fully or clearly understood or defined herein, but observable and detectable to that extent necessary to practice the subject invention and achieve good results. The invention is not limited to the surface phenomenon, but to the steps employed and the results achieved. The "base metal" is selected from that group of metals which are readily evaporable in known evaporation chambers, and which, in the presence of small quantities of oxygen in the course of such evaporation, will form an oxide which finds itself in ready absorptive relationship with the host glass, ceramic, quartz, plastic, or metal, such base metals including aluminum, chromium, copper, manganese, nickel, nickel-chromium alloys (Nichrome), titanium and various stainless steels. The "noble metal" which is finally evaporated atop the base metal includes gold, silver, platinum, rhodium, and iridium. It is also possible, in certain specific instances, to utilize a non-noble metal, such as aluminum, lead and copper.

The invention will be better understood by reference to descriptions of the actual preparation of a seal during the manufacture of a detector 10 of the character illustrated in FIG. 1 or of an infrared detector assembly illustrated in FIG. 8.

In FIG. 1, it will be observed that the outer shell of the detector 10 comprises a glass envelope or tube 11, which in turn consists of an upper tube 12 and a lower tube 14. The glass tube 11 is joined to a metal base 15, and houses a detector element 16 in its interior portion.

The joint 20 is illustrated in accordance with its preparation diagrammatically in FIG. 2. As shown, the upper tube 12 and the lower tube 14 are provided with complementary faces, indicated as upper tube end 18 and lower tube end 19. While the joint faces have been shown here as the cutoff end of a tubular member, it will be appreciated that elliptical configurations, not necessarily lying in a single plane, may also be sealed in accordance with the method described herein.

As will become apparent during the description of the method, the preparation of the face of the tube body 22 with a tube end coating 21, such as illustrated in FIG. 3, is the heart of the invention. From FIG. 3 it will be observed that the tube end 22 has atop it, in an absorptive relationship, an oxide layer 24 of approximately molecular thickness. Thereafter, the oxide layer is covered by the base metal 25 to a depth of about .075 to .10 micron. Prior to the completion of the deposition of the base metal layer 25, evaporation is started of the noble metal 28, and because of the contemporaneous overlapping period of evaporation, a blended interface 26 in which the base metal molecules and noble metal molecules are inextricably interwoven is defined. The noble metal overlay or outer coating 28 is of a thickness from .075 to .10 micron ideally, but if the layer is somewhat thicker, the seal will still be satisfactory.

Turning now to FIG. 5, it will be seen that after the tube end coating 21 has been applied in accordance with the above descriptive material relating to FIG. 3, the upper tube 12 and lower tube 14 may be joined by means of a solder ring 36 which is placed between the two tube portions 12, 14, and the two portions are brought together in such a manner as to physically hold the solder ring 36 therebetween, and thereafter by means most readily adaptable to the assembly techniques, the adjacent area surrounding the solder ring 36 is heated to a sufficient temperature to melt the exterior portion of the solder ring 36 and form a bond with the tube end coating 21, and more particularly the outer noble metal portion 28 thereof. Subsequently, where required, an evacuation tube 38 such as illustrated may be employed to evacuate the interior portion of the tube, sealing the evacuation tube 38 in accordance with known techniques.

In preparing the tubular portions 12, 14 for the joint, when glass is employed it is chemically cleaned by dipping it in a hot chromic acid solution followed by a distilled water wash. In this manner any extraneous chemicals, greases, and other foreign materials are removed and a clean surface results. Thereafter, the glass or metal is heated to at least 500° C., or any temperature sufficiently short of the softening of the material in order to expel any occluded gases and water vapor.

The tubular members 12, 14 are then placed inside an evaporating chamber 29 such as illustrated in FIG. 4. Each is positioned from a convenient tube support diagrammatically illustrated, but the tube support 30 may be of varying configurations depending upon the glass elements to be treated. Subsequently, the chamber is evacuated to $10^{-5}$ mm. of mercury or any other compatible degree of evacuation with reference to the evaporation distance between the filaments and their metal for evaporation in the face to be plated.

As will be observed, a base metal filament 31, and a noble metal filament 34 are provided within the evaporation chamber 29. A base metal ribbon 32 (or base metal powder) is applied to the base metal filament 31. Similarly, a noble metal ribbon 35 (or powder) is applied to the noble metal filament. After the chamber is suitably evacuated to remove all but small contamination proportions of oxygen, the base metal filament is first heated for a period of about a minute. This results in the deposition of the first layer of oxide 24, followed by the .075 to .10 micron layer of base metal 25, preferably chromium oxide and chromium respectively. Prior to turning off the current or heat source to the base metal filament 31, the noble metal filament 34 is heated in order to commence the evaporation of the silver ribbon 35 to define the blended interface 26.

After the silver or noble metal has been deposited in a sufficiently thick layer, the filaments are turned off, and the treated tubular elements 12, 14 removed, and a non-fluxing solder ring 36 is applied thereto and the tube assembled as illustrated in FIG. 5 and described above.

Example I

Two Pyrex brand glass tubes were ground for a complementary fit between their two ends. The ends were then cleaned by dipping them in a chromic acid bath at a temperature of 25° C. After washing with water, the tubes were dried in an oven heated to a temperature of 150° for a period of 60 minutes. Such temperature treatment completely dried the glass tubes and removed any absorbed gases.

The tubes were then placed, end up, within an evaporation chamber manufactured by Vacuum Specialties of Sommerville, Mass. Within such a chamber was positioned a base metal filament 31, as illustrated in the drawing, consisting of tungsten, and a noble metal filament 34 consisting of tungsten. A ribbon of chromium and silver, respectively, were straddled upon these filaments. The chamber was then evacuated to $10^{-5}$ mm. of mercury. Both the noble metal and base metal filaments were preheated to a point slightly below the evaporative level. The evaporant was then elevated to a temperature of 1205° C. for a period of two minutes by applying a voltage of 70 volts, at which time boiling may be observed. This resulted in deposition of a base meal oxide layer 24, as seen in the drawing, followed by a base metal layer 25. The two layers approximate 2 microns in thickness. About 30 seconds before terminating the evaporation of the base metal a current of 50 volts was supplied to the noble metal filament 34. The noble metal evaporant rose to a temperature of approximately 1047° C., and this caused evaporation of the silver ribbon with consequent formation of a blended interface 26 upon each end of the two glass tubes. The noble metal current was supplied for an additional two minutes.

After complete deposition, the current to filament 34 was terminated, the chamber was bled to atmospheric pressure, and the tubes 12 and 14 removed. For assembly, a non-fluxing solder ring 36 comprising 60% tin, 40% lead, was interposed between the two ends of the tubes. This ring was heated by radiant ring heater, to a temperature of 188° C. to cause the outer layers of solder ring to fuse to the ends of the tubes. An integral seal is formed.

During testing, the seal was found to be positive. There was no leakage and a very dependable seal had evidently been created between the two tubes.

The temperatures employed for vaporization of the base and noble metals varies with their vaporization point and the pressure utilized in the evaporation chamber. Generally temperatures of 1000° C. to 1500° C. and pressures of $5\times10^{-5}$ to $1\times10^{-6}$ mm. mercury are used. The foregoing voltages were established empirically to achieve the evaporation required.

While the description of a joint formation herein is related primarily to the employment of chromium as the base metal, and silver as the noble metal principally because of their ready availability, relatively modest cost, and superior qualities, both from a standpoint of method and ultimate seal, alternative metals may be employed in forming a joint. As stated above, alternate base metals include copper, nickel, nickel-chromium alloys and various stainless steels. The alternate noble metals which may be used are platinum, rhodium, iridium, and gold.

Referring now to FIG. 6 for a detailed description of the metal coated substrate, as used for an electronic component, and technique for its preparation, there is shown the raw flat substrate 61 upon which metallic film 62, in this particular instance, gold, is to be bonded in a desired configuration. The configuration shown in FIG. 8 is useful for making a multi-element detector array hereinafter.

The finished product is shown in FIGS. 8 and 9. As seen therein, it comprises the substrate 61 with gold film adhered thereto in a substantially permanent manner. The gold film pattern is formed by the use of an evaporation mask. Initially, gold is deposited in strips 63 to 71 joined by a common header 72. Detector elements 73 to 76 overlie arms 64, 66, 68 and 70, as seen in FIG. 9. A second layer of metal is deposited over a portion of said arms and said detector elements to form an intermeshing relationship for better electrical communication and to accurately mask each element to expose only a predetermined accurate area thereof. Thus multi-element detector arrays, which are not only uniform, but which have reproducible results from array to other array, can be manufactured rather easily.

The following example illustrates the detailed manufacturing steps involved.

Example II

A plurality of quartz substrates 61 having a dimension 0.5 x 1 x 0.027 inch are chemically cleaned by dipping in hot chromic acid followed by washing in pure water, and then heating to a red heat, followed by cooling. The substrates are then masked with an appropriate mask to effect the pattern desired, such as seen in FIG. 8 and then mounted face down in the holding plate 77, preferably using plastic tipped tweezers to avoid contamination. A thermocouple 78 is placed against the back end of each substrate for accurate measurement of the temperature of the substrate as the process proceeds. Each substrate in holding plate 76 is then positioned beneath heater 79. The temperature of the substrate is raised about 200° C. ±5° C. Actually, a range of 150° to 350° C. is operable.

As shown, the exposed face of each individual substrate 61 faces the interior of a vacuum metallizing chamber 80. Within the chamber are a pair of filament boats 81 and 82.

Boat 81 contains a gold alloy of the following composition:

| | Percent |
|---|---|
| Gold | 72 |
| Nickel | 22 |
| Chromium | 6 |
| Tolerances | ±0.5 |

Boat 82 contains pure gold. The boats are successively heated, the alloy boat first.

The vacuum metallizing chamber is flushed with an inert gas, such as nitrogen, helium or argon, and then reduced to a vacuum of $0.5\times10^{-5}$ microns pressure. Actually, the pressure may range from $1\times10^{-4}$ to $1\times10^{-6}$ microns.

Then the individual boats are successively heated, the alloy boat first, generally between 2000 to 5000° C., by a heating means, such as a tungsten filament (not shown) to vaporize the charge of each boat. The total evaporation time is about six and one-half hours. A film having a thickness of about 5000 Angstroms, although the range of thickness may vary between 2000 to 20,000 Angstroms, deposits onto the exposed face of the substrate. A cross section through the film will reveal a gold alloy layer adjacent the substrate, a gold alloy-pure gold interface layer and a top layer of pure gold, much like that shown in FIG. 3. The top layer, in this instance, is pure gold, rather than silver, for better electrical conductivity.

Strips having a width as little as .002 inch on a centerline between each of .005 inch may be effected. It should be evident that such minute structure enables attachment of leads having a dimension no greater than .0005 inch. Thus, miniaturization is possible.

After the evaporation, the substrate is allowed to cool to 80° C. or less, and then the vacuum system is bled with an inert gas followed by air. It is then removed and the evaporation mask taken off the substrate. It is then stored in a plastic box until ready for application of the detector elements, lead sulfide, (PbS) in this instance, and attachment of leads.

The PbS is applied as a coating in the uncoated portion (see FIG. 9) and adjacent coated portion of arms 64, 66, 68 and 70.

Then a second coat of gold is applied over the edge portions of PbS (see 78 and 79 of FIG. 9) and across arms 65, 67, 69 and 71 (see 80 of FIG. 9) to complete a series of circuits (see FIG. 8).

Leads 83 to 91, in this instance gold wire .0005 inch in diameter, are spot welded to the arms 63 to 71 and then the total array capped with a transparent cover 92. The detector array is now ready for incorporation into a circuit of desired function.

To illustrate the strength of the bond between the metal film and the substrate, the following three tests are performed:
Scotch tape test.
Thermocompression bonding test.
Scribing test.

In a successful Scotch tape test, no more than 5% of the film must pull off. In the thermocompression bonding test, the breaking strength is noted. Each bond shall have a breaking strength of not less than 12 gms. per lead (24 gms. for loop of two bonds). Qualification acceptance of the evaporation shall be satisfied after ten consecutive samples have passed the breaking strength requirements. The scribing test consists of the number of passes required by diamond scribing to isolate conductors. One piece from each evaporation shall be scribed. The maximum number of passes needed to isolate shall not exceed 25. If more than 25 passes are required for conductor isolation, then the entire evaporation batch shall be rejected. The criterion for each satisfactory scribe shall be that the scribed area be visually clear with 100× scope with bottom light.

Substantially all substrate made met the above conditions satisfactorily.

By using gold as the noble metal where a coating may be placed on flat glass (or other material), leads may be welded to the gold noble metal layer with an adhesion of unusual strength. For example, .0005 inch wire leads have been so welded with a Kulicke and Soffa thermocomperssion welding machine to gold lines of .001 inch scribed in a glass plate. These lines may be either scribed from a solid evaporated layer or formed by evaporation through a mask.

Although particular embodiments of the invention have been shown and described in full here, there is no intention to thereby limit the invention to the details of such embodiments. On the contrary, the intention is to cover all modifications, alternatives, embodiments, usages and equivalents of the surface joint and preparation thereof as fall within the spirit and scope of the invention, specification and the appended claims.

We claim:

1. A surface joint for a ceramic insulating material comprising in sequential order the ceramic insulating material, a base metal oxide layer bonded to the host material and in absorptive relation therewith, a base metal layer atop the base metal oxide and in absorptive relationship therewith; said base metal being selected from the class consisting of chromium, copper, nickel, nickel-chromium alloys, and stainless steel; and a noble metal layer bonded to the base metal defining therebetween a diffused interface of base and noble metal; said noble metal being selected from a class consisting of gold, platinum, rhodium, iridium and silver.

2. A glass to glass seal comprising a pair of glass elements having complementary adjacent faces, a base metal oxide layer bonded to each glass face, a base metal layer bonded to the base metal oxide layer, said base metal being selected from the class consisting of chromium, copper, nickel, nickel-chromium alloys and stainless steel, said oxide being that of its adjacent base metal; a noble metal layer bonded to the base metal layer and defining therebetween a diffused interface of base and noble metal; said noble metal being selected from a class consisting of gold, platinum, rhodium, iridium and silver; and a solder layer in sealed soldered relationship with each noble metal layer thereby joining the two glass elements in sealed relationship.

3. A glass to glass seal comprising a pair of glass elements having complementary adjacent faces, a chromium oxide layer adjacent each glass face, a chromium metal layer atop the chromium oxide layer, a silver layer atop the base metal layer and defining therebetween a diffused interface of chromium and silver, and a solder layer in sealed soldered relationship with each silver layer thereby joining the two glass elements in sealed relationship.

4. A metal coated substrate comprising, in sequential order, a ceramic insulating material, a base metal oxide layer bonded to said ceramic insulating material and in absorptive relation therewith, a base metal layer bonded to the base metal oxide and in absorptive relationship therewith, said base metal being selected from the class consisting of chromium, copper, nickel, nickel-chromium alloys, titanium, and stainless steel, and a noble metal layer bonded to the base metal defining therebetween a diffused interface of base and noble metal, said noble metal being selected from the class consisting of gold, silver, platinum, rhodium, and iridium.

5. The metal coated substrate of claim 4 wherein said ceramic insulating material is selected from the group consisting of quartz, ceramic, aluminum oxide, plastic and glass.

6. A glass to glass seal comprising a pair of glass elements having complementary adjacent faces, a chromium oxide layer adjacent each glass face, a chromium metal layer bonded to the chromium oxide layer, a silver layer bonded to the base metal layer and defining therebetween a diffused interface of chromium and silver, and a solder layer in sealed soldered relationship with each silver layer thereby joining the two glass elements in sealed relationship.

7. An electronic element comprising a composite, said composite comprising a ceramic insulating material, a base metal oxide layer bonded to the host material and in absorptive relation therewith, a base metal layer bonded to the base metal oxide and in absorptive relationship therewith; said base metal being selected from the class consisting of chromium, copper, nickel, nickel-chromium alloys, and stainless steel; a noble metal layer bonded to the base metal defining therebetween a diffused interface of base and noble metal; said noble metal being selected from a class consisting of gold, platinum, rhodium, iridium and silver, a detector secured to said noble metal; and a lead affixed to and extending from another face of said noble metal.

8. The electronic element of claim 7 wherein said layers of material bonded to ceramic insulating material is divided into a plurality of finely divided strips so as to form a multi-element detector array with a plurality of detectors, one secured to each of the noble metal surfaces of said strips and with leads affixed to and extending from each strip.

9. The electronic component of claim 8 wherein said detectors comprise PbS.

10. An electronic element comprising in sequential order a ceramic insulating material, a base metal oxide layer bonded to the ceramic insulating material and in absorptive relation therewith, a base metal layer bonded to the base metal oxide layer and in absorptive relation therewith, said base metal being selected from the class consisting of chromium, copper, nickel, nickel-chromium alloys, and stainless steel, a noble metal layer bonded to the base metal layer and defining therebetween a diffused interface of base and noble metal, said noble metal being selected from the class consisting of gold, platinum, rhodium, iridium, and silver, said ceramic insulating material having portions of the coating thereon removed so as to form separate areas of the coating, and leads connecting to the coating in the separate areas.

References Cited

UNITED STATES PATENTS

| | | | |
|---|---|---|---|
| 2,975,078 | 3/1961 | Rayfield | 117—217 |
| 3,098,930 | 7/1963 | Clark | 136—214 X |
| 3,106,489 | 10/1963 | Lepselter. | |
| 3,107,756 | 10/1963 | Gallet. | |
| 3,115,957 | 12/1963 | Heil | 29—195 X |
| 3,197,290 | 7/1965 | Williams | 29—195 |
| 3,243,313 | 3/1966 | Aves. | |

HYLAND BIZOT, *Primary Examiner.*